US012661692B2

(12) United States Patent
     Gardiner et al.

(10) Patent No.:    US 12,661,692 B2
(45) Date of Patent:        Jun. 23, 2026

(54) EXCITER APPARATUS

(71) Applicant: FLSmidth A/S, Valby (DK)

(72) Inventors: Michael Gardiner, Rochedale South (AU); Tejas Halani, Chermside (AU); Shanoon Alhassan, Auchenflower (AU); Clayton Seymour, Brisbane (AU); Byron Sadler, Pinkenba (AU); Gordon Ong, Wakerley (AU)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 18/703,711

(22) PCT Filed: Oct. 19, 2022

(86) PCT No.: PCT/IB2022/060026
     § 371 (c)(1),
     (2) Date: Apr. 22, 2024

(87) PCT Pub. No.: WO2023/067512
     PCT Pub. Date: Apr. 27, 2023

(65) Prior Publication Data
     US 2025/0229296 A1        Jul. 17, 2025

(30) Foreign Application Priority Data

Oct. 20, 2021    (DK) ........................... PA 2021 01001

(51) Int. Cl.
     *F16C 35/04*        (2006.01)
     *B06B 1/16*         (2006.01)
     (Continued)

(52) U.S. Cl.
     CPC ................. *B07B 1/42* (2013.01); *B06B 1/16* (2013.01); *B07B 1/284* (2013.01); *F16C 19/26* (2013.01);
     (Continued)

(58) Field of Classification Search
     CPC ..... B07B 1/28; B07B 1/42; B06B 1/16; F16C 19/26; F16C 33/6659
     (Continued)

(56) References Cited

U.S. PATENT DOCUMENTS 4,340,469 A * 7/1982 Archer ...................... B07B 1/42
                                                209/315

FOREIGN PATENT DOCUMENTS

AU        2016299064 A1 *  2/2018  ............... B07B 1/42
CN         204420109 U   *  6/2015
          (Continued)

OTHER PUBLICATIONS

The International Search Report and Written Opinion, dated Jan. 31, 2023, 12 pages. The positive International Preliminary Report on Patentability, dated Jun. 10, 2023, 13 pages.

*Primary Examiner* — Terrell H Matthews
(74) *Attorney, Agent, or Firm* — Jeffrey A. Sharp

(57)                ABSTRACT

An exciter apparatus for a vibrating machine having an exciter body being configured to accommodate a lubricant. The exciter apparatus further has a first bearing comprising an inner bearing portion and an outer bearing portion separated by a number of rollers located in a gap between the inner bearing portion and outer bearing portion. A first shaft is rotatably connected to the exciter body by means of the first bearing. The first shaft has eccentric masses. The first bearing seat and the outer bearing portion comprising a through hole allowing a fluid to flow through the first bearing seat and the outer bearing portion into the gap, The exciter apparatus further comprising a lubricant provision means configured to provide a lubricant from the lubrication zone to the through hole.

20 Claims, 6 Drawing Sheets

(51) Int. Cl.

| | | |
|---|---|---|
| *B07B 1/28* | (2006.01) | |
| *B07B 1/42* | (2006.01) | |
| *F16C 19/26* | (2006.01) | |
| *F16C 33/66* | (2006.01) | |

(52) U.S. Cl.
CPC ........ *F16C 33/6659* (2013.01); *F16C 35/042* (2013.01); *F16C 2320/00* (2013.01)

(58) Field of Classification Search
USPC ...................................................... 209/366.5
See application file for complete search history.

(56)                        References Cited

FOREIGN PATENT DOCUMENTS

| | | | | |
|---|---|---|---|---|
| CN | 108708907 A | * | 10/2018 | ............... F16N 7/14 |
| CN | 108716609 A | * | 10/2018 | ............... F16N 7/38 |
| CN | 108855881 A | * | 11/2018 | ............... F16N 11/00 |
| DE | 4131164 A1 | * | 3/1993 | ......... F16H 57/0471 |
| WO | WO-0211905 A1 | * | 2/2002 | ............. B07B 1/284 |

* cited by examiner

EXCITER APPARATUS

FIELD OF INVENTION

The present invention relates to a vibrating machine such as a vibrating screen or vibrating feeder and in particular an improved exciter apparatus for vibrating said vibrating machine.

BACKGROUND

Vibrating screen machines for use in the mineral processing industries are commonly used to separate minerals such as coal or ore by size, usually after crushing. The apparatus generally comprises one or more screen decks to screen the minerals. The screen machines are vibrated by exciter apparatus generally mounted on a heavy cross beam located at the top of the screen machine. The exciter apparatus typically comprises a number of shafts having eccentric masses attached thereto. The shafts are allowed to rotate by means of a number of bearings. The bearings in an exciter are critical elements in the operation of an exciter gearbox. It is essential that the bearings are lubricated properly otherwise the exciter can generate excessive heat and premature failure of the bearings and the exciter.

In a typical screen exciter, the lubrication system for these bearings is via splashing the lubricant around inside the casing and onto the side of the bearing rollers as they rotate. The splashing of lubricant is typically provided using either gears or an oil flinger. The method of lubrication provides very little or even no control over the amount of oil getting to the bearings and/or that all the bearing rollers are receiving a complete covering of oil.

As exciters get larger the lubrication of the bearings becomes more important. The loads on the bearings are higher thus the bearings get larger in diameter and width and thus, more difficult for oil to translate across the surface of the bearing to cover all the rollers with oil. With typical oil splash method using flingers/gears, the lubricant is flung away from the bearings rather than towards/into the bearings where it is needed.

It is therefore desirable to provide an exciter apparatus with a more reliable lubrication system which due to the improved lubrication of the rollers provides better cooling and prolongs the life the bearings.

SUMMARY OF THE INVENTION

With this background, it is therefore an object of the present invention to provide an exciter apparatus for a vibrating machine, comprising:

an exciter body comprising a first bearing seat, said exciter body being configured for accommodating a lubricant and having a lubrication zone in a lower portion of the exciter body;

a first bearing comprising a first inner bearing portion and a first outer bearing portion separated by a number of rollers located in a first gap between the first inner bearing portion and first outer bearing portion, the first outer bearing portion being attached to the first bearing seat such that the inner bearing portion is configured to rotate relative to the exciter body;

a first shaft attached to the first inner bearing portion, the first shaft comprising eccentric masses causing the exciter apparatus to vibrate upon rotation thereof;

wherein the first bearing seat and the first outer bearing portion comprising a through hole allowing a fluid to flow through the first bearing seat and the first outer bearing portion into the first gap, and wherein the exciter apparatus further comprising a lubricant provision means configured to provide a lubricant from the lubrication zone to the through hole.

The through hole in the outer bearing portion ensures that a lubricant in the exciter apparatus is efficiently provided into the first gap in the first bearing. A lubricant is essential to reduce the friction of the rollers and thereby to reduce the temperature in the exciter apparatus and to prolong the lifetime of the bearing. During intended use of the exciter apparatus a lubricant is provided to the exciter body. The lubricant will naturally flow towards the lowest point in the exciter body which is the lubrication zone where the lubricant is collected. The lubricant provision means is configured to provide the lubricant from the lubrication zone to the through hole such that the lubricant is efficiently added directly into the rollers in the gap. This design has shown to provide more efficient lubrication compared to typical splash lubrication. As the lubricant is provided from the lubricant zone to the gap it is distributed in the bearing as the rollers rotate. At least some of the lubricant flows out of the bearing and is collected in the lubricant zone. The volume of lubricant in the lubricant zone is thereby maintained at a steady state level and recirculated to lubricate the rollers.

In one or more embodiments an inner surface of the first bearing seat and/or an outer surface of the first outer bearing portion comprising a first groove. The first groove may alternatively be comprised of a groove in both the first bearing seat and the outer surface of the outer bearing portion. The groove may be located along at least a part of the inner circumference of the first bearing seat. Alternatively, it may be located along the entire inner circumference of the first bearing seat. Additionally, or alternatively, the first groove may be located along at least a part of the outer circumference of the first outer bearing portion, or it may be located along the entire outer circumference of the first outer bearing portion.

The groove and the through hole are preferably fluidly connected such that a lubricant provided through the through hole is provided directly into the first groove. The groove provides enhanced distribution of lubricant around the bearing and therefore reduce the friction and heat of the rollers. Additionally, it has been found that the groove reduces the back pressure (the pressure acting upon the lubricant).

In one or more embodiments the lubricant provision means is a rotatable lubricant provision means at least partially located in the lubrication zone and configured to distribute lubricant around inside the exciter body upon rotation, said rotatable lubricant provision means optionally being a flinger device or a gear wheel.

The rotatable lubricant provision means may be attached to the shaft, or coupled to the shaft by means of gears, such that rotation of the shaft provides the rotatable lubricant provision means to rotate.

A flinger device may also be known as a slinger or a dipper. Such devices are well known in the art. By the wording distribute is means that the lubricant is splashed around inside the exciter body.

In one or more embodiments the lubricant provision means is a fluid pump configured to pump a lubricant from the lubrication zone to the through hole, said fluid pump optionally being coupled to and driven by the first shaft. The pump is fluidly connected to the lubrication zone and to a location in the exciter body near the through hole, such that the fluid pump may provide a flow of lubricant from the lubrication zone to the through hole. The fluid pump may be fluidly coupled to a manifold which may divide the flow into sub streams being provided into the exciter apparatus at different locations. The fluid pump may be an electric pump, or it may be driven mechanically by the rotation of the shaft.

In one or more embodiments the fluid pump is located externally of the exciter apparatus, e.g. attached to an external surface of the exciter apparatus. In the external configuration the manifold is preferably also located externally of the exciter apparatus and coupled to the exciter apparatus by a number of pipes or hoses. The external configuration allows for easy access to the fluid pump and manifold and thereby allows for easy adjustment of flows to different locations in the exciter apparatus.

In one or more embodiments the exciter apparatus further comprising a lubricant reservoir having an open upper end adapted to receive a lubricant, the lubricant reservoir being located adjacent the through hole and being located in the exciter body such that a lubricant located in the lubricant reservoir is provided to the gap by means of gravity. The lubricant reservoir may have a funnel shape which will increase the amount of lubricant collected in the lubricant reservoir. During intended use of the exciter apparatus, the shafts will rotate and due to the eccentric masses start to vibrate. The vibration along with the rotation bearings and engaging means cause the lubricant to splash around inside the exciter body where it eventually will collect in the lubricant zone. By providing a lubricant reservoir some of the lubricant will be collected in the lubricant reservoir and may run directly into the gap. By providing the flinger device or by arranging the engaging means at least partially in the lubricant zone, an increasing amount of lubricant is splashed around in the exciter body and may be collected in the lubricant reservoir. As the lubricant is collected and stored in the lubricant reservoir, a lubricant fluid column is formed, which due to gravity directs the lubricant through the through hole and into the gap. In one or more embodiments the lubricant reservoir is located above the first shaft.

In one or more embodiments at least a part of an outer surface of the bearing seat is gutter shaped. The gutter shaped part is preferably configured to collect lubricant being splash into the gutter shaped part and guide the lubricant towards the through hole and the lubricant reservoir.

In one or more embodiments a gutter arrangement is located on an inner surface of the exciter body, said gutter arrangement adapted to collect lubricant. Preferably the gutter arrangement is configured to divert collected lubricant towards the through hole and the lubricant reservoir.

By providing a gutter arrangement or having a gutter shaped bearing seat, increase the inflow of lubricant to the through hole and optionally the lubricant reservoir. An increased volume of lubricant provided to the lubricant reservoir, allows for the lubricant reservoir to be filled and to maintain a desired volume of lubricant. Pressure provided by the fluid column of lubricant in the lubricant reservoir provides an increased lubricant flow through the through hole, into the first groove and consequently into the gap.

In one or more embodiments the lubricant reservoir is located in a substantially radial direction from the first shaft. Preferably the lubricant reservoir is located in a substantially radial direction from the rotatable lubricant provision means. During rotation of the shafts a lubricant located on the engaging means and optionally the flinger device will accelerate due to the rotation. This location of the lubricant reservoir in the exciter body providing increased collection of lubricant.

In one or more embodiments a gutter arrangement is provided to an internal surface of the exciter body, preferably an end wall of the exciter apparatus located in a radial direction of the first or second bearings. Preferably the gutter arrangement is located substantially along the width of the end wall or the exciter apparatus. Preferably the end wall is perpendicular to a radial direction of the first bearing.

As the lubricant provision means rotate, the lubricant is slung in a substantial tangential direction of rotation. Thus, the lubricant is slung towards the gutter arrangement provided on the end wall, which effectively can collect and direct the lubricant towards the through hole.

In one or more embodiments the exciter apparatus comprising two or more lubricant reservoirs. Preferably two lubricant reservoirs are located on opposite sides of the first bearing seat. The two or more lubricant reservoirs may be joined or separate reservoirs. The lubricant reservoirs may be fluidly connected to the gap by means of a dedicated through hole.

In one or more embodiments the exciter apparatus comprising a second bearing seat. The second bearing seat comprises a second bearing. The second bearing comprising a second inner bearing portion and a second outer bearing portion separated by a number of rollers located in a second gap between the second inner bearing portion and second outer bearing portion. The second outer bearing portion being attached to the second bearing seat such that the inner bearing portion is configured to rotate relative to the exciter body. A second shaft may be attached to the second inner bearing portion and comprising eccentric masses. An inner surface of the second bearing seat and/or an outer surface of the second outer bearing portion comprising a second groove. The second groove being fluidly connected to the first groove. Preferably the first bearing seat is located adjacent the second bearing seat, such that the first groove and the second groove may be fluidly connected by a channel.

Grooves in each of the bearings and/or bearing seats have been found to improve lubrication of the rollers. It has also been found that by fluidly connecting the first groove and the second groove, a single lubricant reservoir which is fluidly connected to one of the grooves is sufficient for providing lubricant into the rollers of both bearings and thereby enhance the performance of both the first and second bearing. During intended use, as the rollers in the first bearing rotate, the lubricant that is provided to the first bearing through the through hole is distributed along the groove and into the channel where the lubricant further is provided into the second bearing. Preferably the grooves are circular grooves extending along the whole inner circumference of the bearing seat or the outer circumference of the outer bearing portion.

In one or more embodiments a plurality of through holes are provided in the first outer bearing portion and/or the second outer bearing portion. Preferably the through holes are located in the gutter shaped portion of the outer bearing. A plurality of though holes allow the lubricant to be provided directly the gap at several different locations and therefore provides increased lubrication of the rollers.

In one or more embodiments a fluid reservoir comprising is located between the first bearing and second bearing. One or more through holes may fluidly connect the fluid reservoir to the gap of the first bearing or second bearing.

In one or more embodiments the bearing seats have a circular shape and together form a substantial infinity shape having a lubricant reservoir formed between the two circular parts. Preferably at least one through hole is provided from this lubricant reservoir through the bearing seat into the gap of the first or second bearing.

In one or more embodiments the exciter apparatus comprises a deflector device located in an upper internal portion of the exciter body. Preferably the deflector is located above the first bearing seat. The deflector device is configured to direct lubricant splashed around by the rotatable lubricant provision means in a desired direction. Preferably the deflector device is configured to direct a lubricant towards the one or more lubricant reservoirs. The deflector device may have a ramp shape, or a triangular shape suitable for directing a fluid in a desired direction. In one or more embodiment the exciter apparatus comprises a removably connected lid portion and wherein the deflector device is attached to an inner surface of the lid portion.

In one or more embodiments the deflector device is located centrally above the first bearing seat and the second bearing seat. Alternatively, the deflector device is located above the first bearing seat and the second bearing seat but with an offset towards the first bearing seat or second bearing seat.

A centrally located defector device may be located substantially between the first and second shaft and equally distribute the lubricant towards to opposite directions, e.g., towards a first lubricant reservoir and a second lubricant reservoir. If the deflector device is located with an offset towards the first bearing or second bearing the lubricant is more likely to be distributed towards one or the other side. This configuration may be preferred when there is only a single lubricant reservoir. When the exciter apparatus is inclined the flow of lubricant may naturally flow towards the bearing which is located at the lowest point in the exciter apparatus. In such a configuration it may be preferred to have the deflector located such that an increased amount of lubricant is deflected towards the uppermost bearing.

Typically, the exciter apparatus is inclined with respect to horizontal. Upon rotation of the eccentric masses, the inclination causes both vertical and horizontal movement of the exciter apparatus and thus causes both vertical and horizontal movement of any particles in the vibrating machine.

In some embodiments of the invention the bearings are provided in pairs, such that a first set of bearings are provided opposite of each other and coupled to the first shaft. Similarly, a second set of bearings may be provided opposite of each other and coupled by the second shaft.

In one or more embodiments the first and second shaft comprises engaging means. The engaging means rotatably connects the first and second shaft. The engaging means may be gear wheels. The engaging means is preferably located internally in the exciter body. Alternatively, the engaging means may be located externally from the exciter body. When the engaging means are located on the first and second shaft internally in the exciter body and arranged at least partially in the lubrication zone, the engaging means may be the rotatable lubricant provision means.

In another aspect the invention relates to a vibrating machine comprising the exciter apparatus.

The vibrating machine may be a vibrating screen or a vibrating feeder.

Further presently preferred embodiments and further advantages will be apparent from the following detailed description and the appended dependent claims.

BRIEF DESCRIPTION OF THE DRAWINGS

The invention will be described in more details below by means of non-limiting examples of presently preferred embodiments and with reference to the schematic drawings, in which.

DETAILED DESCRIPTION OF EMBODIMENTS OF THE INVENTION

Figure 1:
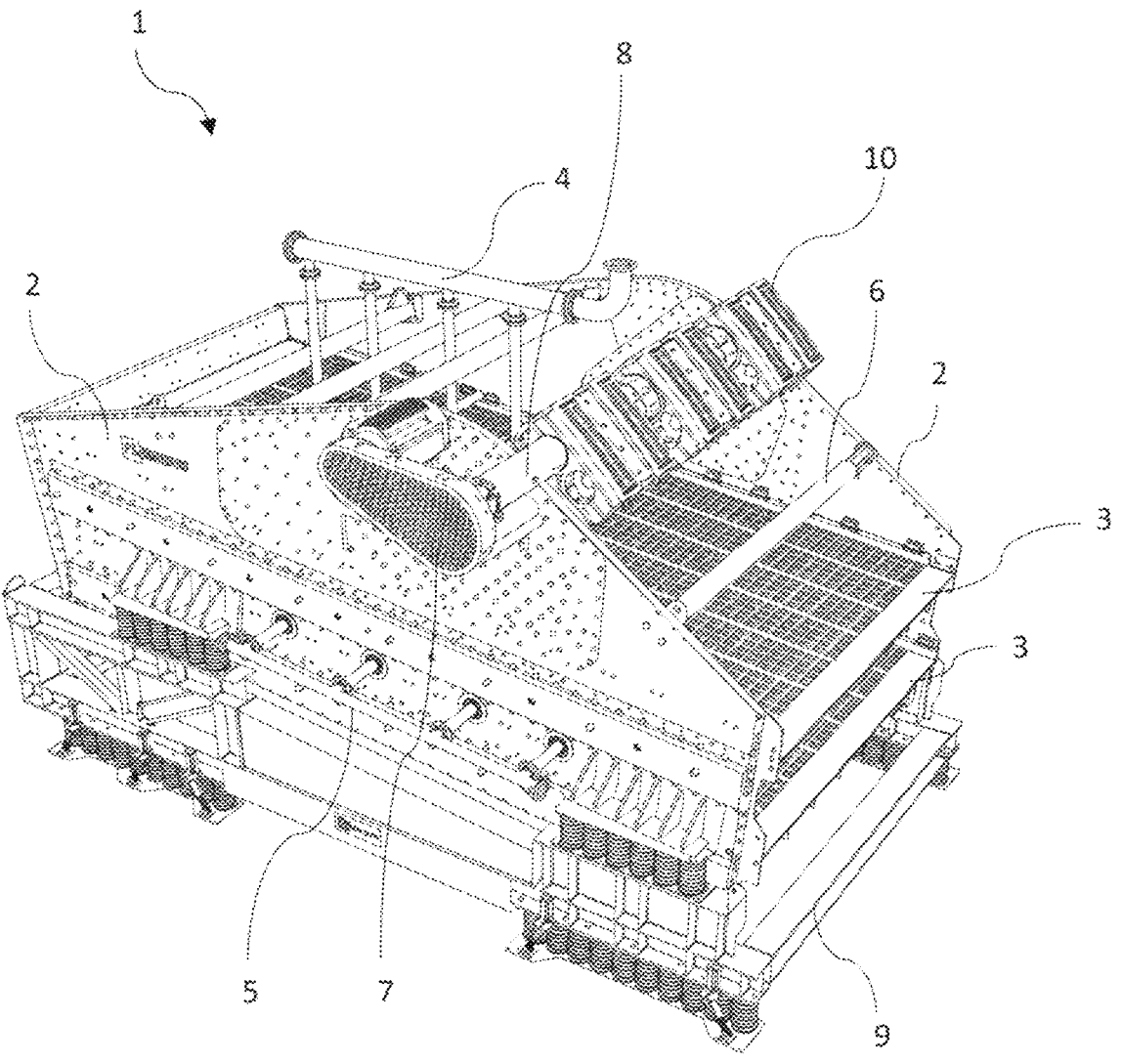
FIG. 1 shows a schematic drawing of a vibrating screen machine comprising an exciter apparatus according to an embodiment of the invention.

FIG. 1 shows a vibrating screen machine in the form of a double deck horizontal vibrating screen 1. The vibrating screen 1 comprises two parallel side plates 2 spaced from each other and connected by a number of cross members (not shown). Two screen decks 3 are located one above the other between the two side plates 2 and being supported by a number of deck support members (not shown) located below each screen deck 3. An upper and lower water spray system (4,5) are located above each screen deck and being adapted to provide water onto the screen decks 3. A plurality of lifting beams 6 are located above the upper screen deck 3. A drive arrangement 7 is located on the outer side of the side plate 2. Three exciter apparatus' 10 are arranged on a drive beam 12 which is attached to each of the side plates 2. The drive arrangement 7 is coupled to a number of shaft members 8. The drive arrangement 7 is configured to rotate the shaft members 8 and thereby to drive the exciter apparatus' 10. The vibrating screen 1 is located upon a support structure 9. During intended use the exciter apparatus' 10 causes the vibrating screen to vibrate.

Figure 2:
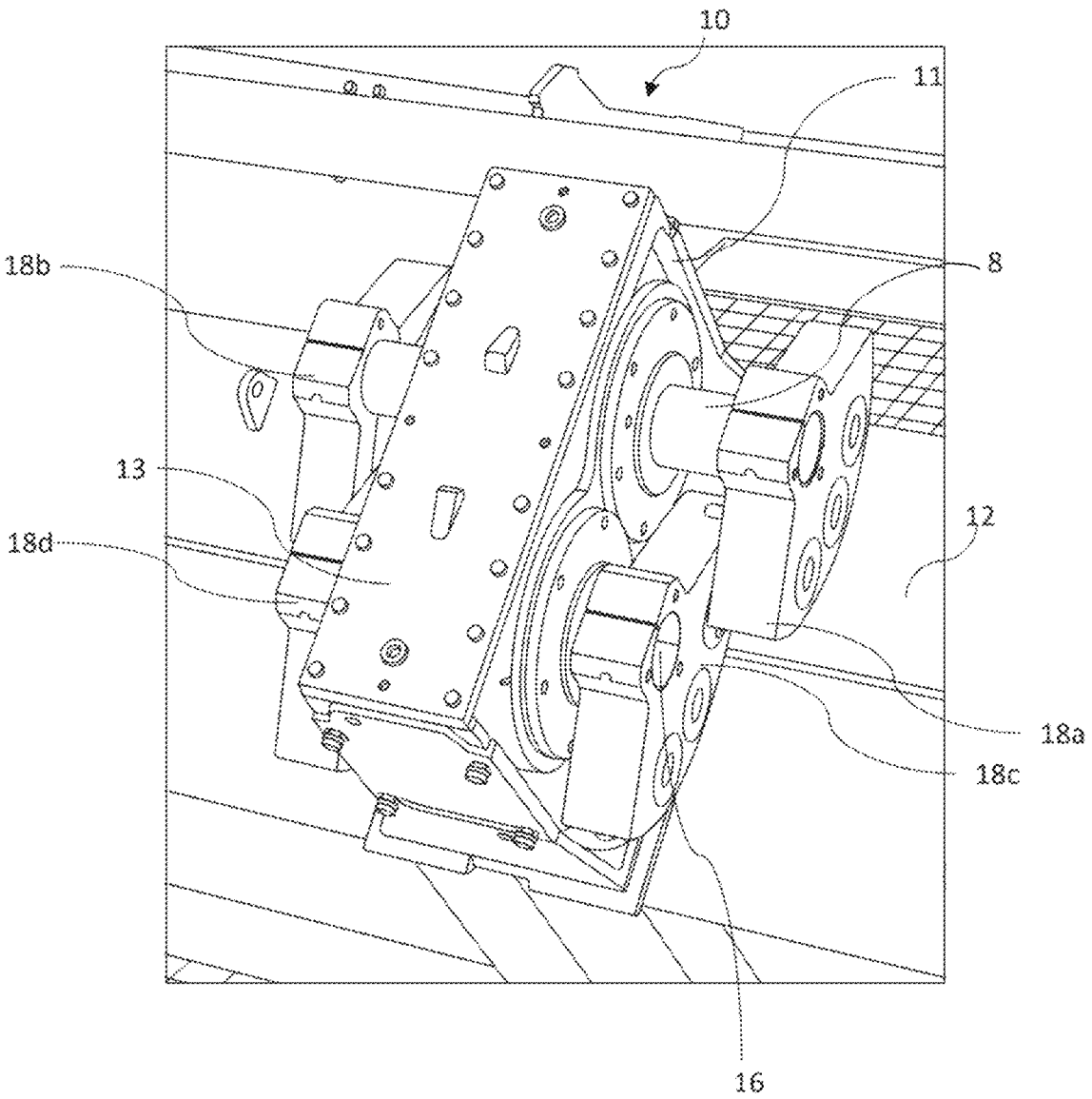
FIG. 2 shows a schematic drawing of an exciter apparatus according to an embodiment of the invention.

Turning now to FIG. 2 showing an exciter apparatus 10 in greater detail. The exciter apparatus 10 has an exciter body 11. The exciter body 11 is substantially liquid tight, such that it may accommodate a lubricant, which due to the orientation of the exciter apparatus 10 will collect in the lubricant zone (not shown) in the lower portion of the exciter body. The exciter apparatus 10 is inclined with respect to horizontal, such that the shaft member 8 is located above the second shaft member 16. The lower portion of the exciter body 11 is attached to the drive beam 12. An exciter lid 13 is attach to the upper portion of the exciter body 11. A shaft member 8 is arranged through the exciter body 11 and rotatably attached to the exciter body by means of a first set of bearings (not shown). The exciter apparatus further comprises a second shaft member 16 arranged through the exciter body 11 and rotatably attached to the exciter body 11 by means of a second set of bearings (not shown). The shaft member 8 and the second shaft member 16 are rotatably connected by means of engaging means in the form of two engaging gear wheels 26 and 27 located in the exciter body 11. Eccentric masses 18a, 18b, 18c, and 18d are attached to the shaft member 8 and second shaft member 16. Because the masses of the eccentric masses 18a, 18b, 18c, and 18d are off-center from the point of rotation the exciter apparatus starts to vibrate, upon rotation thereof.

Figure 3:
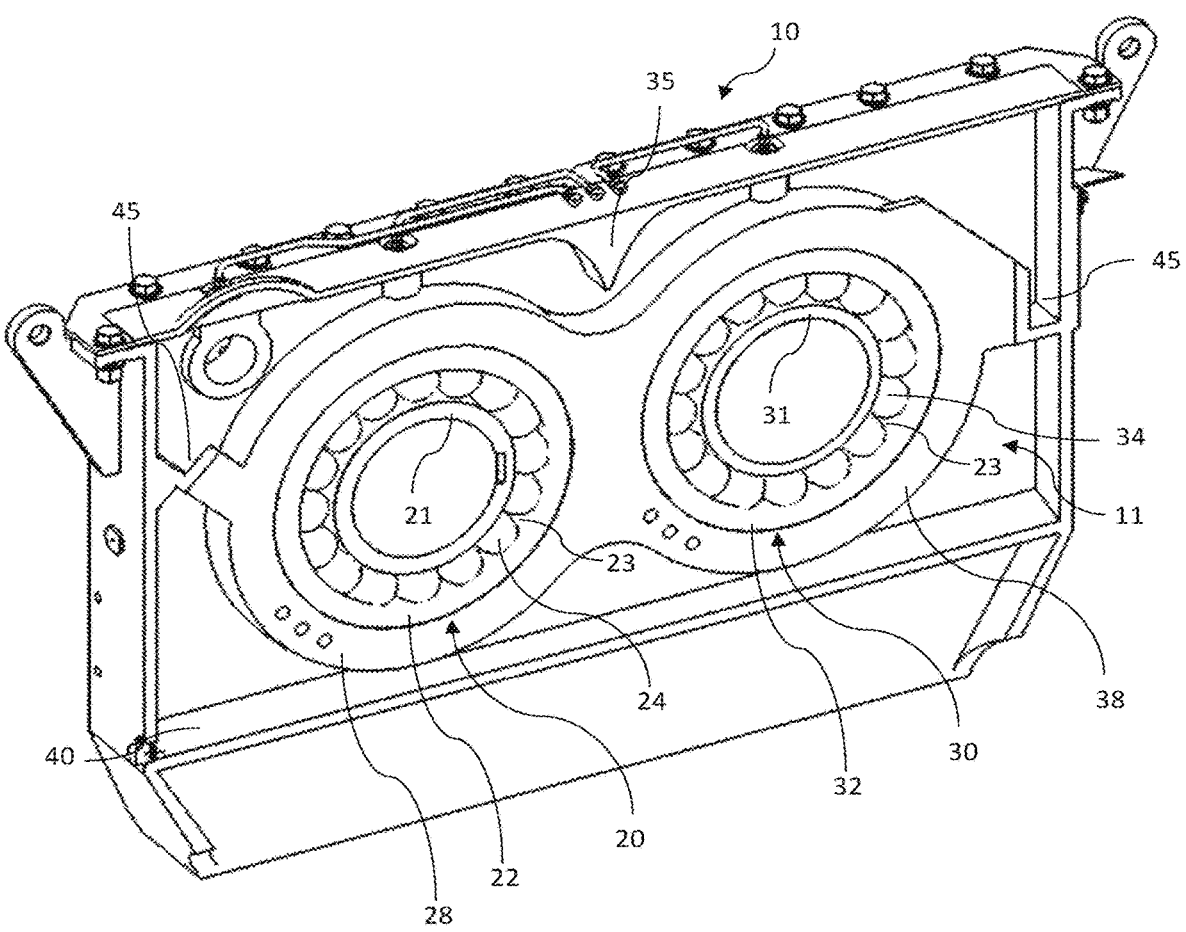
FIG. 3 shows a cross section of an exciter body according to an embodiment of the invention.

Turning now to FIG. 3 showing the inner portion of the exciter body 11 together with a first bearing 20 located in a first bearing seat 28 and a second bearing 30 located in a second bearing seat 38. The first bearing 20 comprising an inner bearing portion 21 and an outer bearing portion 22 separated by a number of rollers 24 located in a gap 23 between the inner bearing portion 21 and the outer bearing portion 22. Similarly, the second bearing 30 comprising an inner bearing portion 31 and an outer bearing portion 32 separated by a number of rollers 34 located in a gap 33 between the inner bearing portion 31 and the outer bearing portion 32. The first inner bearing portion 21 being attached to the shaft member 8 and the second inner bearing portion 31 being attached to the second shaft member 16. Each of the first outer bearing portion 22 and second outer bearing portion 32 being attached to the respective bearing seats 28, 38, such that the shaft member 8 and second shaft 16 are configured for rotating relative to the exciter body 11. The first outer bearing portion 22 comprising a through hole 25 extending through the outer bearing portion 22 such that a fluid may flow through the first outer bearing portion 22 into the gap 23.

A deflector device 35 is located on the upper inner portion of the exciter body 11. The deflector device 35 is located centrally between the first bearing 20 and the second bearing 30. Alternatively, the deflector device 35 may be located with an offset towards the first bearing 20 or second bearing 30.

Figure 4:
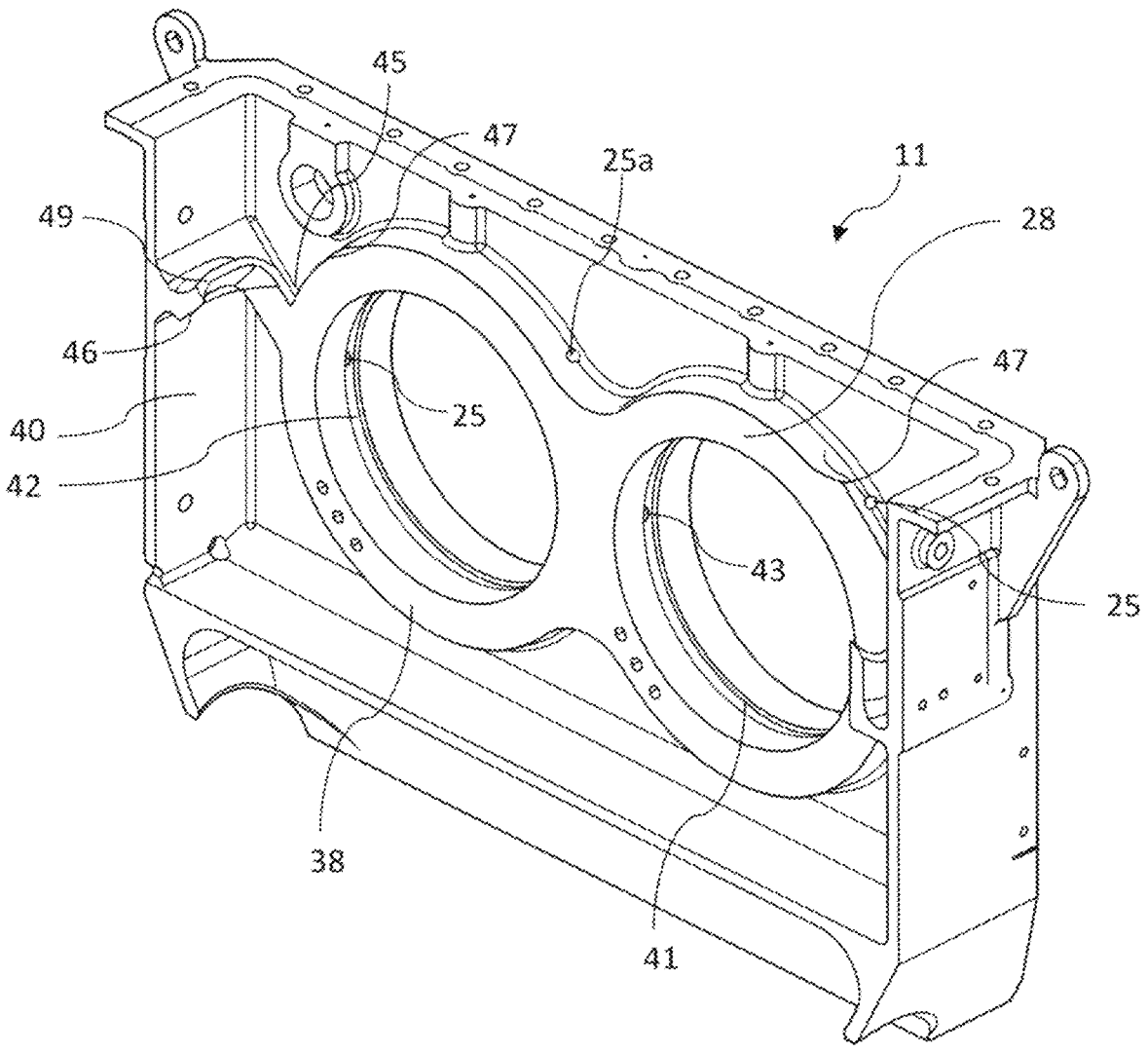
FIG. 4 shows a cross section of an exciter body according to an embodiment of the invention.

Turning now to FIG. 4 showing the inner surface 40 of the exciter body 11 in greater detail. The first bearing seat 28 comprising a groove 41. The second bearing seat 38 comprising a groove 42. A number of through holes 25 are configured to provide a fluid from outside the bearing seat 28 and bearing seat 38 into the groove 41 and groove 42. A channel 43 is extending through the first bearing seat 28 and second bearing seat 38 from the groove 41 to the groove 42, thereby allowing fluid in one of the grooves to flow into the other groove.

Lubricant reservoirs 45 are located in both ends of the exciter body 11. The reservoirs have an open upper end such that they may receive a lubricant. The lubricant reservoir 45 is fluidly connected to the through hole 25. The lubricant reservoir 45 is located above the through hole 25, such that a lubricant in the lubricant reservoir 45 may flow through the through hole 25 into the gap 41,42 by means of gravity. The reservoir 45 is formed by the inner surface 40 and an outer edge 46. Because of the height of the outer edge 46 a fluid column of lubricant may collect in the lubricant reservoir 45. The weight of the fluid column may increase the flow through the through hole 25. Additional through holes 25a may be located around the upper periphery of the first and second bearing seats 28, 38.

A part of the outer surface of the bearing seats 28 and 38 has an extending edge that form a gutter 47 and is adapted to collect a lubricant. The gutter shape is connected to the reservoir 45 such that collected lubricant is diverted to the through hole 25. Preferably the gutter allows the collected lubricant to flow along the outer surface of the bearing seats 28 and 38 into the reservoir 45.

A second gutter 49 is provided to the inner surface 40 in the ends of the exciter apparatus 10 to further collect and divert lubricant to the through hole.

Figure 5:
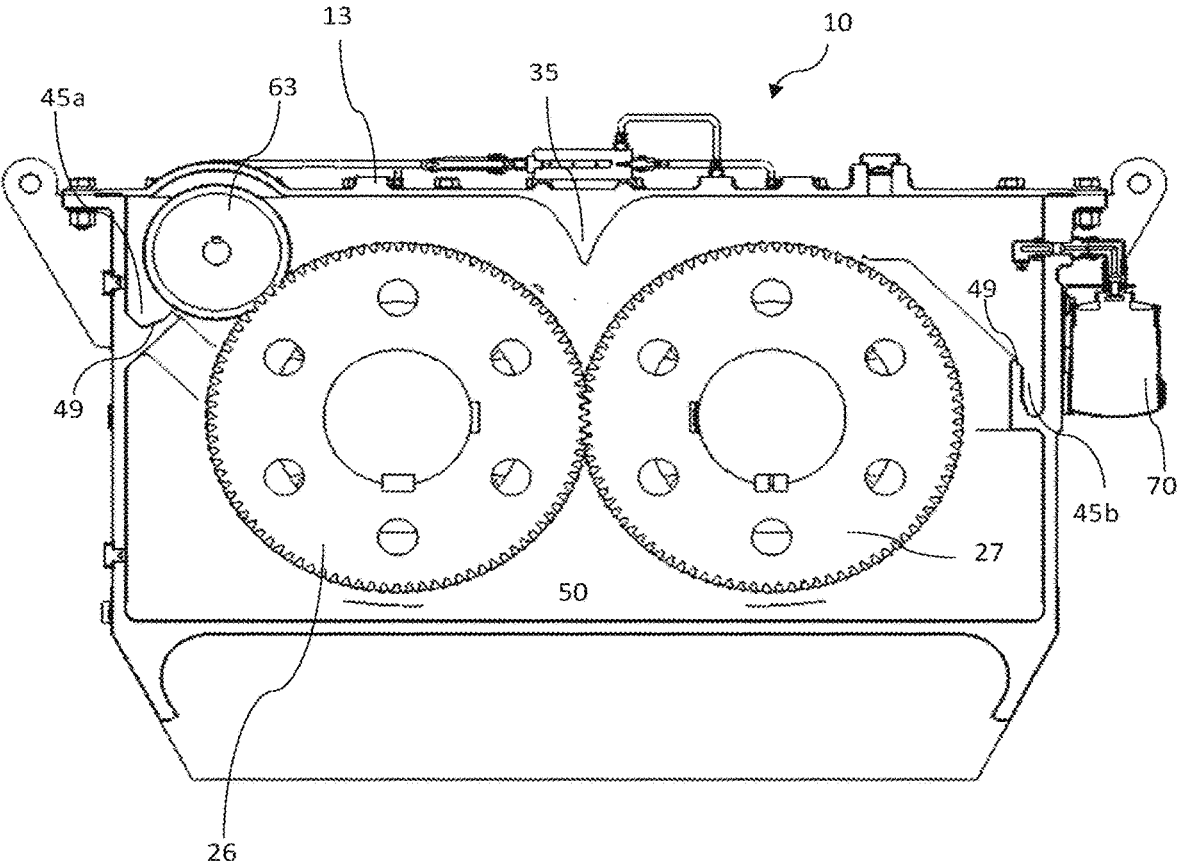
FIG. 5 shows a cross sectional view of the internal of an exciter apparatus according to an embodiment of the invention.

Turning now to FIG. 5 showing a cross-sectional view of the exciter apparatus 10. The exciter apparatus 10 comprising a rotatable lubricant provision means in the form of a first gear wheel 26 and a second gear wheel 27. The first gear wheel 26 and second gear wheel 27 are engaging thereby rotatably connecting the shaft member 8 and the second shaft member 16.

The bottom portion of the exciter body 11 is liquid tight such that when it is partially filled with a lubricant, a lubrication zone 50 is formed in the lower portion. During intended use of the exciter apparatus 10, it is inclined with respect to horizontal as seen in FIG. 1 and FIG. 2. During such orientation the lubrication zone 50 is formed in the lowest corner of the exciter apparatus 10. At least one of the first gear wheel 26 and/or the second gear wheel 27 is at least partially located in the lubrication zone 50. During intended use the first gear wheel 26 is rotated anticlockwise and the second gear wheel 27 is rotated clockwise. Upon rotation of the gear wheel(s), the outer surface of the gear wheel(s) is rotated through the lubrication zone 50 and contacts the lubricant. As the gear wheel(s) rotates the lubricant is hurled around inside the exciter body 11. Lubricant is thereby transported from the lubrication zone 50 to the lubricant reservoir 49 and further through the through hole 25 into the bearings. Because of the inclination of the exciter apparatus 10, the lubricant reservoir 45a is located closer to the lid 13 than the lubricant reservoir 45b. The height at which each of the lubricant reservoirs 45 are located are determined based on the desired inclination of the exciter apparatus 10.

Figure 6:
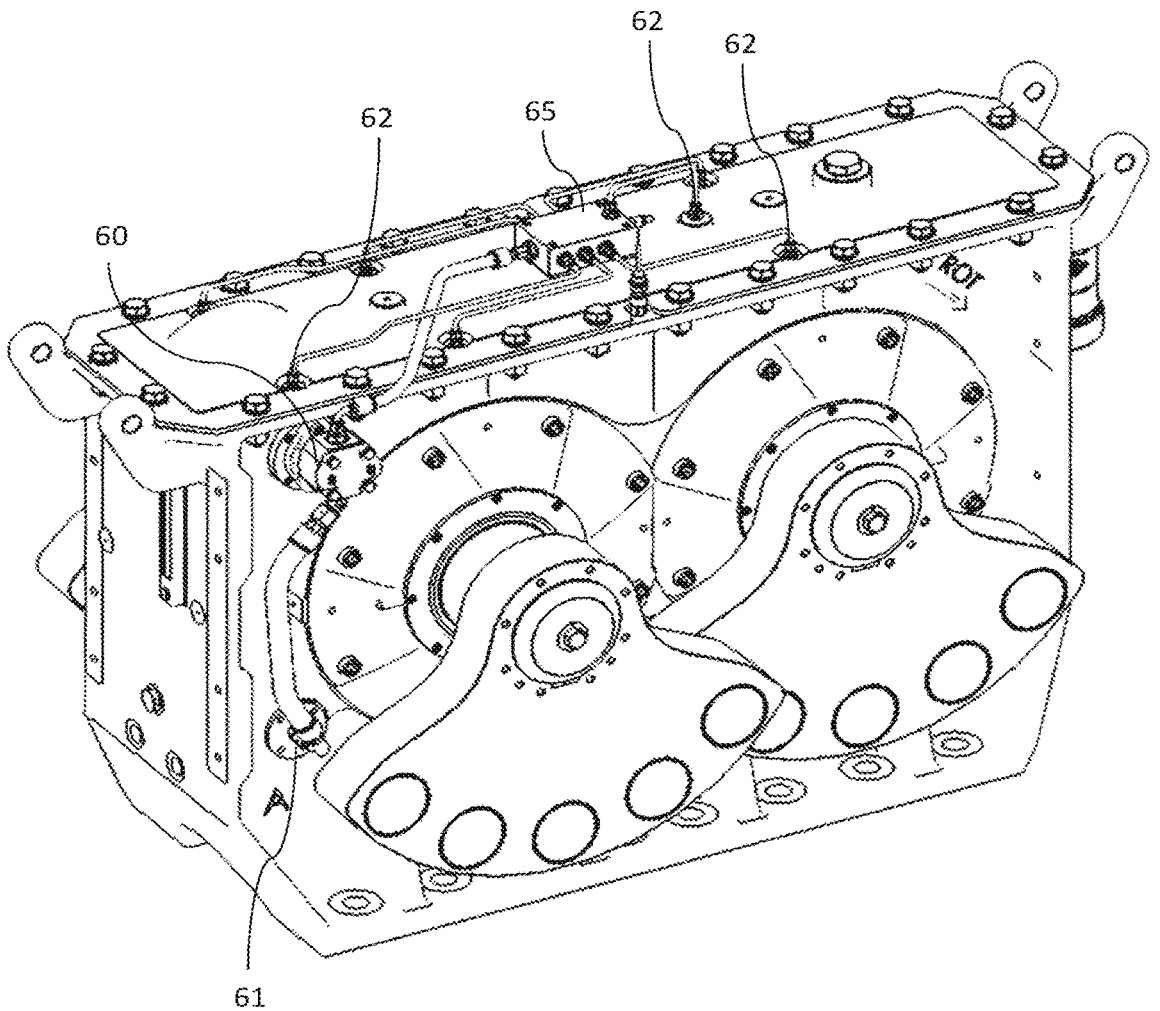
FIG. 6 shows a perspective view of an exciter apparatus according to an embodiment of the invention.

The deflector device 35 arranged above and between the first gear wheel 26 and second gear wheel 27 deflects the hurled lubricant towards the lubricant reservoirs 45. In the embodiment shown the deflector device 35 is located centrally between the first bearing 20 and the second bearing 30. A breather 70 is connected to the exciter apparatus 10. The breather 70 allows gas to flow in and out of the exciter apparatus 10 as the temperature changes during use and the volume of gas in the exciter apparatus increases. The embodiment in FIG. 5 and FIG. 6 shows an optional feature in the form of a fluid pump 60 and its related components such as the rotatable member 63 which drives the fluid pump 60. The fluid pump 60 may be used as an additional lubricant provision means to provide lubricant from the lubrication zone 50 to the lubricant reservoir 45. The fluid pump 60 fluidly connects the lubrication zone 50 to the lubricant reservoir 45b through a liquid outlet 61 and a number of liquid inlets 62. In the embodiment shown in FIG. 6, the exciter apparatus 10 has a manifold 65, which distributes the pumped lubricant between several liquid inlets 62. The fluid pump 60 is connected to and driven by the first gear wheel 26 by the rotatable member 63. The manifold 65 is not required together with the fluid pump 60. Instead, the pumped lubricant may be supplied to a single liquid inlet at to the lubricant reservoir.

The invention claimed is:

1. An exciter apparatus for a vibrating machine, such as a screen machine or a feeder, comprising:

an exciter body comprising a first bearing seat, said exciter body being configured for accommodating a lubricant and having a lubrication zone in a lower portion of the exciter body;

a first bearing comprising an inner bearing portion and an outer bearing portion separated by a number of rollers located in a gap between the inner bearing portion and outer bearing portion, the outer bearing portion being attached to the first bearing seat such that the inner bearing portion is configured to rotate relative to the exciter body;

a first shaft attached to the inner bearing portion, the first shaft comprising eccentric masses causing the exciter apparatus to vibrate upon rotation thereof;

wherein the first bearing seat and the outer bearing portion comprising a through hole allowing a fluid to flow through the first bearing seat and the outer bearing portion into the gap, and wherein the exciter apparatus further comprising a lubricant provision means config-
ured to provide a lubricant from the lubrication zone to
the through hole;

a lubricant reservoir having an open upper end adapted to
receive the lubricant, the lubricant reservoir located
adjacent and above the through hole and located in the
exciter body such that the lubricant located in the
lubricant reservoir is provided to the gap by means of
gravity; and a gutter formed from an extending edge on an outer
surface of the first bearing seat, the gutter formed to
divert the lubricant to the lubricant reservoir.

2. The exciter apparatus according to claim 1, wherein an
inner surface of the first bearing seat and/or an outer surface
of the outer bearing portion comprising a first groove.

3. The exciter apparatus of any one of claims 1-2,
wherein:

the lubricant provision means is a rotatable lubricant
provision means at least partially located in the lubri-
cation zone and configured to distribute lubricant
around inside the exciter body upon rotation, said
rotatable lubricant provision means includes at least
one of a flinger device, a gear wheel, or a fluid pump
configured to pump a lubricant from the lubrication
zone to the through hole, said fluid pump optionally
being coupled to and driven by the first shaft.

4. The exciter apparatus of any one of claims 1-3, wherein
the gutter includes a first gutter and further comprising a
second gutter provided on an inner end surface of the exciter
body.

5. The exciter apparatus of any one of claims 1, 2, 3, 4,
wherein the lubricant reservoir is a first lubricant reservoir,
and further comprising a second lubricant reservoir.

6. The exciter apparatus of any one of claims 1, 2, 3, 4, 5,
further comprising a second bearing seat and a second
bearing located in said second bearing seat, wherein an inner
surface of the second bearing seat and/or an outer surface of
the second outer bearing seat comprising a second groove,
said second groove being fluidly connected to the first
groove.

7. The exciter apparatus according to claim 6, wherein the
lubricant reservoir is a first lubricant reservoir, and further
comprising a second lubricant reservoir, and wherein the
first lubricant reservoir and the second lubricant reservoir
are located on opposite sides of the first bearing seat and the
second bearing seat.

8. The exciter apparatus according to claim 6, wherein the
through hole includes a plurality of through holes in at least
one of the first bearing seat and the second bearing seat.

9. The exciter apparatus of any one of claims 1, 2, 3, 4, 5,
6, 7, 8, wherein the exciter apparatus comprises a deflector
device located in an upper portion of the exciter body.

10. The exciter apparatus according to claim 9, further
comprising a lid portion, and wherein the deflector device is
provided on an internal surface of the lid portion.

11. The exciter apparatus according to claim 9 or 10,
further comprising a second bearing seat, and wherein the
deflector device is located above and between the first
bearing seat and the second bearing seat.

12. The exciter apparatus of any one of claims 1, 2, 3, 4,
5, 6, 7, 8, 9, 10, 11, further comprising a second bearing seat,
and wherein the exciter apparatus is inclined with respect to
horizontal, such that the first bearing seat is located above
the second bearing seat.

13. A vibrating screen machine or a vibrating feeder
comprising the exciter apparatus of amy one of claims 1, 2,
3, 4, 5, 6, 7, 8, 9, 10, 11, 12.

14. The exciter apparatus according to claim 5, wherein
the second lubricant reservoir is located on an opposite side
of the first bearing from the first lubricant reservoir.

15. The exciter apparatus according to claim 9, wherein
the deflector device is located above the first bearing seat.

16. The exciter apparatus according to claim 11, wherein
the deflector device is offset towards the first bearing seat.

17. An exciter apparatus for a vibrating machine, such as
a screen machine or a feeder, comprising:

an exciter body comprising a first bearing seat, said
exciter body being configured for accommodating a
lubricant and having a lubrication zone in a lower
portion of the exciter body;

a first bearing comprising an inner bearing portion and an
outer bearing portion separated by a number of rollers
located in a gap between the inner bearing portion and
outer bearing portion, the outer bearing portion being
attached to the first bearing seat such that the inner
bearing portion is configured to rotate relative to the
exciter body;

a first shaft attached to the inner bearing portion, the first
shaft comprising eccentric masses causing the exciter
apparatus to vibrate upon rotation thereof;

wherein the first bearing seat and the outer bearing portion
comprising a through hole allowing a fluid to flow
through the first bearing seat and the outer bearing
portion into the gap, and wherein the exciter apparatus
further comprising a lubricant provision means config-
ured to provide a lubricant from the lubrication zone to
the through hole; and a deflector device located in an upper portion of the
exciter body and extending into the exciter body.

18. The exciter apparatus according to claim 17, further
comprising a lid portion to seal the exciter body, and
wherein the deflector device is provided on an internal
surface of the lid portion.

19. The exciter apparatus according to claim 17, further
comprising a second bearing seat, and wherein the deflector
device is located above and between the first bearing seat
and the second bearing seat.

20. The exciter apparatus according to claim 19, wherein
the deflector device is offset towards the first bearing seat.

* * * * *